United States Patent
Shiozaki et al.

(10) Patent No.: US 10,582,072 B2
(45) Date of Patent: Mar. 3, 2020

(54) INFORMATION PROCESSING APPARATUS AND NON-TRANSITORY COMPUTER READABLE MEDIUM COMPRISING A DISPLAY SCREEN INCLUDING BASIC OPERATOR FOR EXECUTION OF CERTAIN FUNCTION

(71) Applicant: FUJI XEROX CO., LTD., Tokyo (JP)

(72) Inventors: Ichiro Shiozaki, Kanagawa (JP); Nobumi Kusano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/653,548

(22) Filed: Jul. 19, 2017

(65) Prior Publication Data
US 2018/0103163 A1 Apr. 12, 2018

(30) Foreign Application Priority Data
Oct. 12, 2016 (JP) .................................. 2016-200586

(51) Int. Cl.
*G06F 3/12* (2006.01)
*H04N 1/00* (2006.01)

(52) U.S. Cl.
CPC ....... *H04N 1/00413* (2013.01); *G06F 3/1205* (2013.01); *G06F 3/1253* (2013.01); *H04N 1/00493* (2013.01); *H04N 2201/0094* (2013.01)

(58) Field of Classification Search
USPC .................. 358/1.1–3.29, 1.11–1.18
See application file for complete search history.

(56) References Cited

U.S. PATENT DOCUMENTS

| | | | | |
|---|---|---|---|---|
| 6,185,321 | B1 * | 2/2001 | Fukushima | H04N 1/00843 382/135 |
| 2007/0253035 | A1 * | 11/2007 | Takesada | H04N 1/00395 358/468 |
| 2007/0285675 | A1 * | 12/2007 | Okada | H04N 1/00363 358/1.1 |
| 2015/0046879 | A1 * | 2/2015 | Orimoto | G06K 15/005 715/835 |
| 2017/0096325 | A1 * | 4/2017 | Marston | B67D 7/02 |
| 2018/0097946 | A1 * | 4/2018 | Kirihara | H04N 1/00514 |

FOREIGN PATENT DOCUMENTS

| | | |
|---|---|---|
| JP | 2015-114915 | 6/2015 |
| JP | 2015-115841 | 6/2015 |

* cited by examiner

*Primary Examiner* — Marcellus J Augustin
(74) *Attorney, Agent, or Firm* — JCIPRNET

(57) ABSTRACT

An information processing apparatus includes a display that displays a screen including a basic operator for selecting execution of a certain function and a related operator related to the basic operator, and a generation unit that in a case of selecting a basic operator to generate a new related operator, inherits attribute information on the selected basic operator and generates the related operator.

14 Claims, 15 Drawing Sheets

FIG. 14
HOME SCREEN EXAMPLE
(AFTER GENERATION OF ONE-TOUCH APPLICATION)

INFORMATION PROCESSING APPARATUS AND NON-TRANSITORY COMPUTER READABLE MEDIUM COMPRISING A DISPLAY SCREEN INCLUDING BASIC OPERATOR FOR EXECUTION OF CERTAIN FUNCTION

CROSS-REFERENCE TO RELATED APPLICATIONS

This application is based on and claims priority under 35 USC 119 from Japanese Patent Application No. 2016-200586 filed Oct. 12, 2016.

BACKGROUND

Technical Field

The present invention relates to an information processing apparatus and a non-transitory computer readable medium.

SUMMARY

According to an aspect of the invention, there is provided an information processing apparatus including a display that displays a screen including a basic operator for selecting execution of a certain function and a related operator related to the basic operator; and a generation unit that when selecting a basic operator to generate a new related operator, inherits attribute information on the selected basic operator and generates the related operator.

BRIEF DESCRIPTION OF THE DRAWINGS

Exemplary embodiment(s) of the present invention will be described in detail based on the following figures, wherein.

DETAILED DESCRIPTION

Next, exemplary embodiments of the present invention will be described in detail with reference to the drawings.

Figure 1:
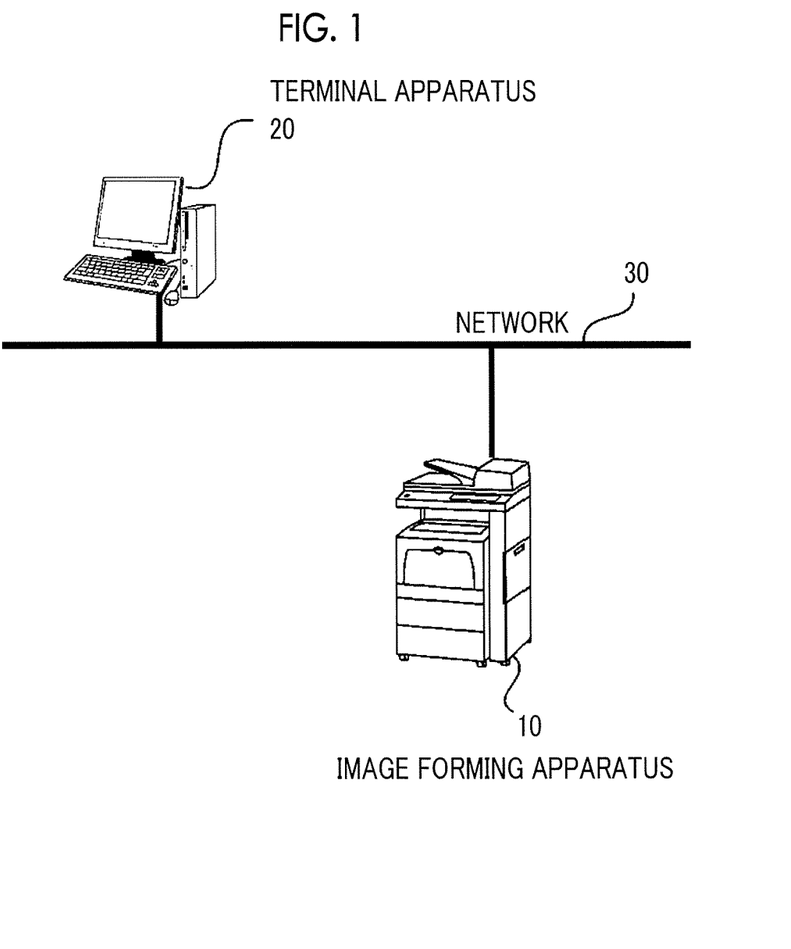
FIG. 1 is a diagram illustrating a configuration of an image forming system including an image forming apparatus that is an information processing apparatus according to an exemplary embodiment of the present invention.

FIG. 1 is a diagram illustrating a configuration of an image forming system including an image forming apparatus 10 that is an information processing apparatus according to an exemplary embodiment of the present invention.

As shown in FIG. 1, the image forming system according to the present exemplary embodiment includes an image forming apparatus 10 and a terminal apparatus 20 mutually connected through a network 30. The terminal apparatus 20 generates print data and transmits the generated print data to the image forming apparatus 10 through the network 30. The image forming apparatus 10 receives the print data transmitted from the terminal apparatus 20, and outputs an image corresponding to the print data on the paper. The image forming apparatus 10 is a so-called multifunction peripheral having plural functions such as a print function, a scan function, a copy function, a facsimile function, and the like.

Figure 2:
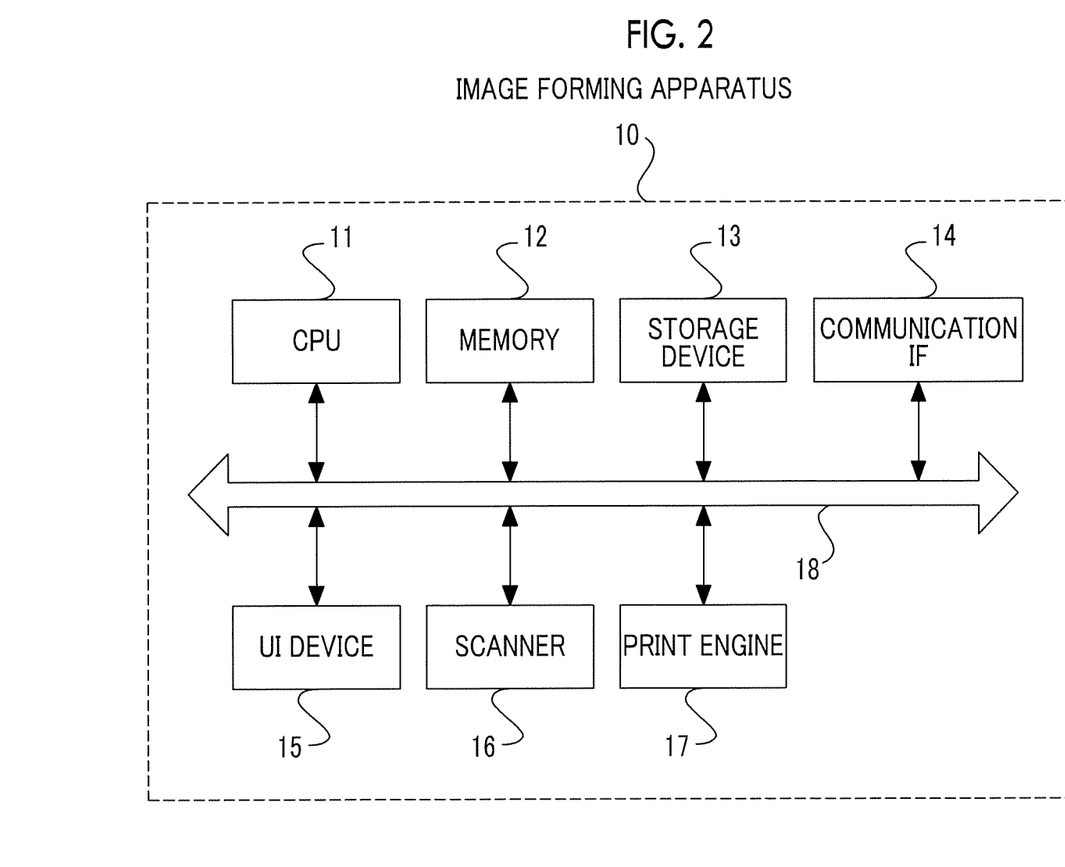
FIG. 2 is a block diagram showing a hardware configuration of the image forming apparatus according to the exemplary embodiment of the present invention.

Next, the hardware configuration of the image forming apparatus 10 in the image forming system of the exemplary embodiment is shown in FIG. 2.

As shown in FIG. 2, the image forming apparatus 10 includes a CPU 11, a memory 12, a storage device 13 such as a hard disk drive (HDD), a communication interface (IF) 14 that transmits and receives data to and from an external device or the like through the network 30, a user interface (UI) device 15 including a touch panel or a liquid crystal display and a keyboard, a scanner 16, and a print engine 17. These components are connected to each other through a control bus 18.

The print engine 17 prints an image on a recording medium such as printing paper through steps such as charging, exposure, development, transfer, and fixing.

The CPU 11 executes a predetermined process based on a control program stored in the memory 12 or the storage device 13 to control the operation of the image forming apparatus 10. In the present exemplary embodiment, it is described that the CPU 11 reads and executes the control program stored in the memory 12 or the storage device 13, but it is also possible to store the program in a storage medium such as a CD-ROM and to provide the program to the CPU 11.

Figure 3:
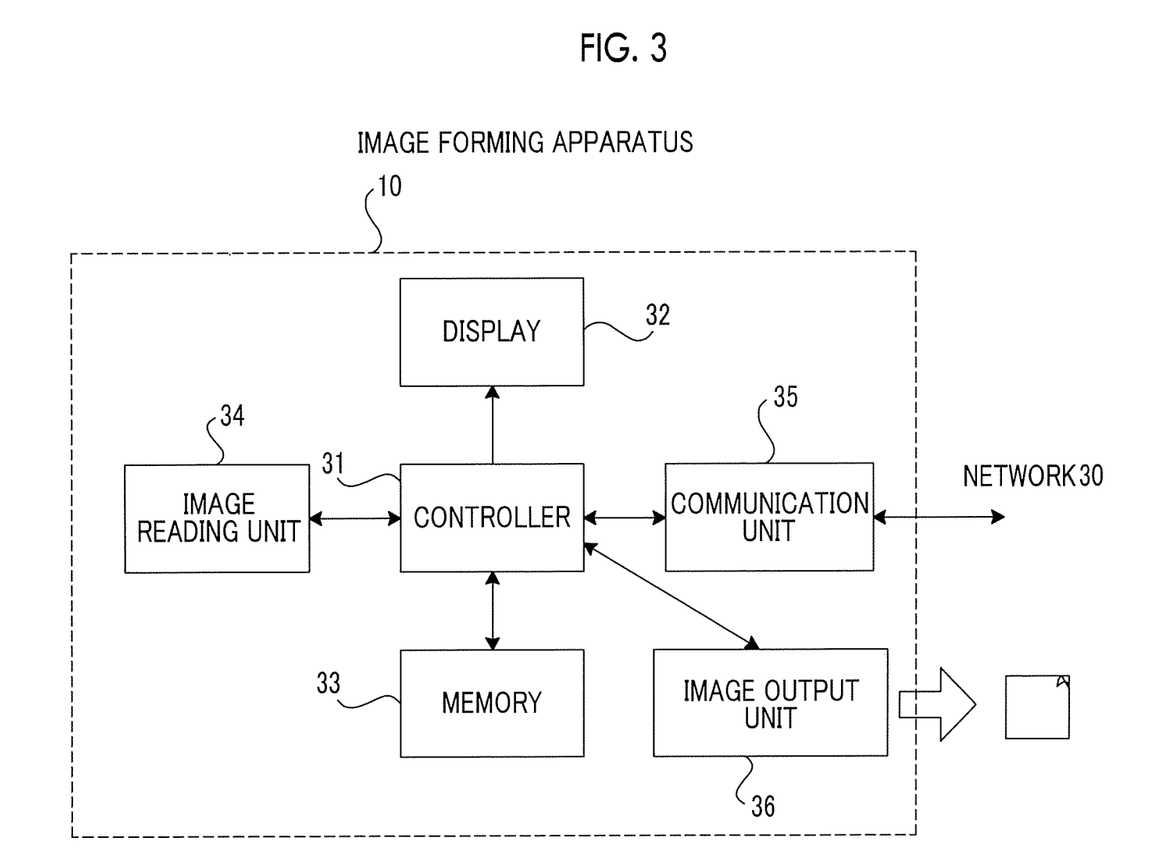
FIG. 3 is a block diagram showing a functional configuration of the image forming apparatus according to the exemplary embodiment of the present invention.

FIG. 3 is a block diagram showing a functional configuration of the image forming apparatus 10 realized by executing the control program.

As shown in FIG. 3, the image forming apparatus 10 of the present exemplary embodiment includes a controller 31, a display 32, a memory 33, an image reading unit 34, a communication unit 35, and an image output unit 36.

The display 32 is constituted by an operation panel such as a so-called touch panel, and receives an operation for the image forming apparatus 10 or displays the operation result, the processing result, and the like to show the result to the user. Then, the display 32 displays an operation screen including a basic icon for selecting execution of a certain function and a related icon related to the basic icon.

Here, the basic icon is an icon for activating an application program (hereinafter abbreviated as an application) or a program for executing basic functions of the image forming apparatus 10, such as copy, scan, facsimile transmission, device setting, and authentication setting. In addition, the related icon means an icon generated related to the basic icon, such as a one-touch application icon, which is generated based on the basic icon.

Further, the classification between the basic icon and the related icon is not limited to the above-described case. For example, it is also possible to classify an icon already existing in the initial state where the image forming apparatus 10 is not customized by the user as the basic icon, and an icon which does not exist in the initial state and is generated by customization by the user as the related icon.

Therefore, in a case of installing a new application from a server in the image forming apparatus 10, an icon for activating the installed application may be a basic icon or a related icon in some cases. Specifically, in a case of classification according to whether or not the icon is generated based on the basic icon, the icon is classified as the basic icon because it is not generated based on the basic icon. Then, in a case of classification according to whether or not the icon exists in the initial state of the image forming apparatus 10, the icon is classified as the related icon because it does not exist in the initial state.

The memory 33 is a memory for temporarily storing image data and the like while the process is performed by the controller 31.

The image reading unit 34 performs a process of reading the set original document and converting it into image data.

The communication unit 35 receives a source of data from external apparatuses such as the terminal apparatus 20, receives a print job from the terminal apparatus 20, performs facsimile transmission of image data, or transmits or receives e-mails.

The image output unit 36 performs an operation based on an instruction from the controller 31, and performs a process of printing the image data on a recording medium such as printing paper and outputting the recording medium.

The controller 31 controls the display 32, the memory 33, the image reading unit 34, the communication unit 35, the image output unit 36, and the like to execute various processes such as a printing process, a copying process, and a reading process of an original document image.

In a case of selecting a basic icon to generate a new one-touch application icon (related icon), the controller 31 inherits the attribute information of the selected basic icon and generates a one-touch application icon.

Specifically, the attribute information is at least one piece of information or a combination of plural pieces of information of information on the appearance of the icon such as the outer shape and the display color of the icon, and information on the appearance on the icon specific screen such as arrangement order of setting items of the icon and information for selecting display or non-display for each setting item.

Furthermore, the attribute information also includes authority information indicating what function each user can use. Specifically, the authority information stores setting details in such a manner that a user is permitted to perform copying but another user is prohibited from copying, or a user can use color printing but another user can only use black and white printing.

In a case of selecting a basic icon to generate a new one-touch application icon, the controller 31 displays the attribute of the selected basic icon on the display 32 in a state of being initially selected, on a screen for selecting the attribute of the one-touch application icon to be generated.

Here, the setting value which is set in advance by the user is associated with the related icon such as the one-touch application. The setting value is set based on the value input on the screen displayed by selecting the basic icon.

Next, the display contents of the display 32 in the image forming apparatus 10 of the present exemplary embodiment will be described. First, FIG. 4 shows an example of the display contents of the display 32 in the image forming apparatus 10 of the present exemplary embodiment.

Figure 4:
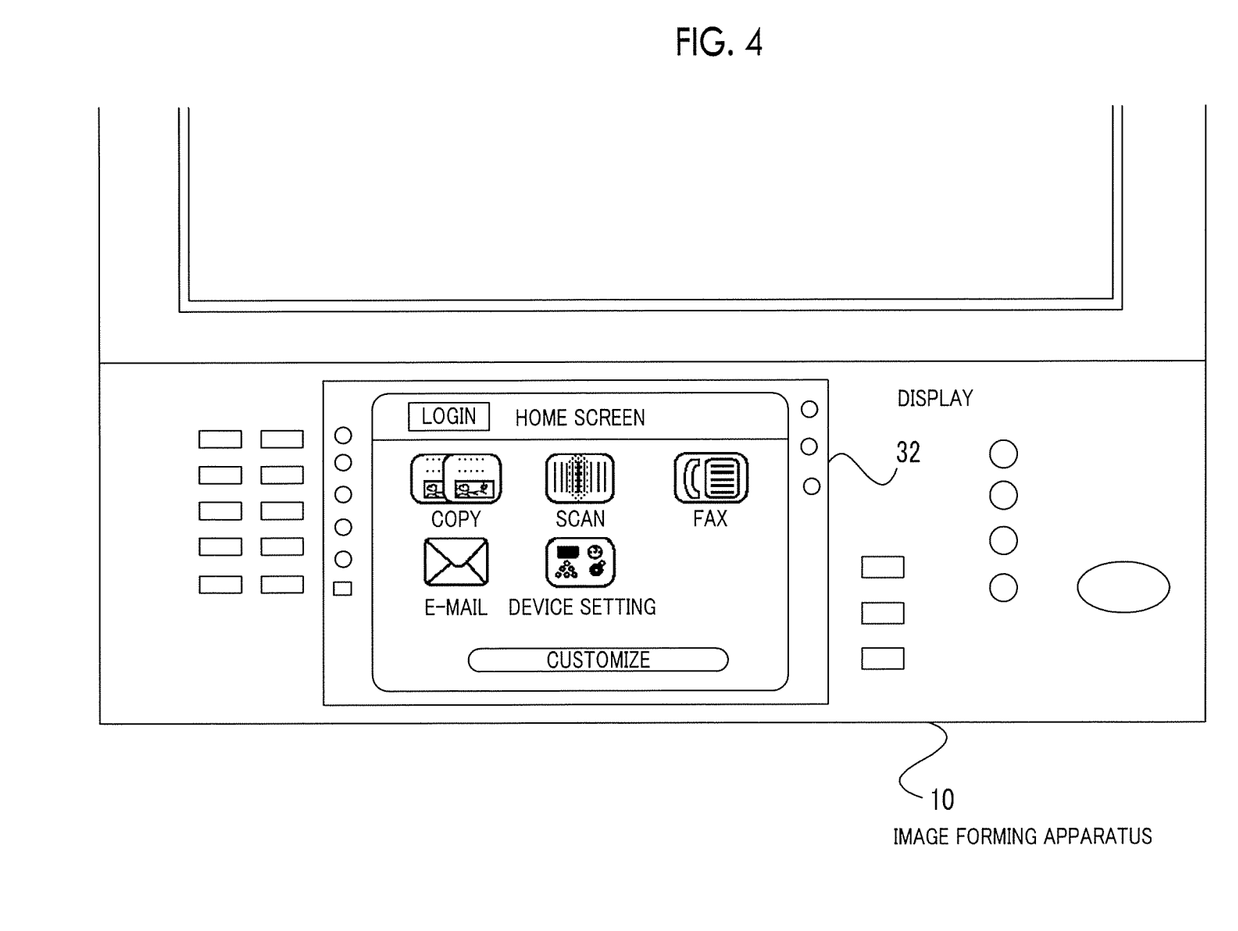
FIG. 4 is a diagram showing an example of display contents of a display in the image forming apparatus according to the exemplary embodiment of the present invention.
Figure 5:
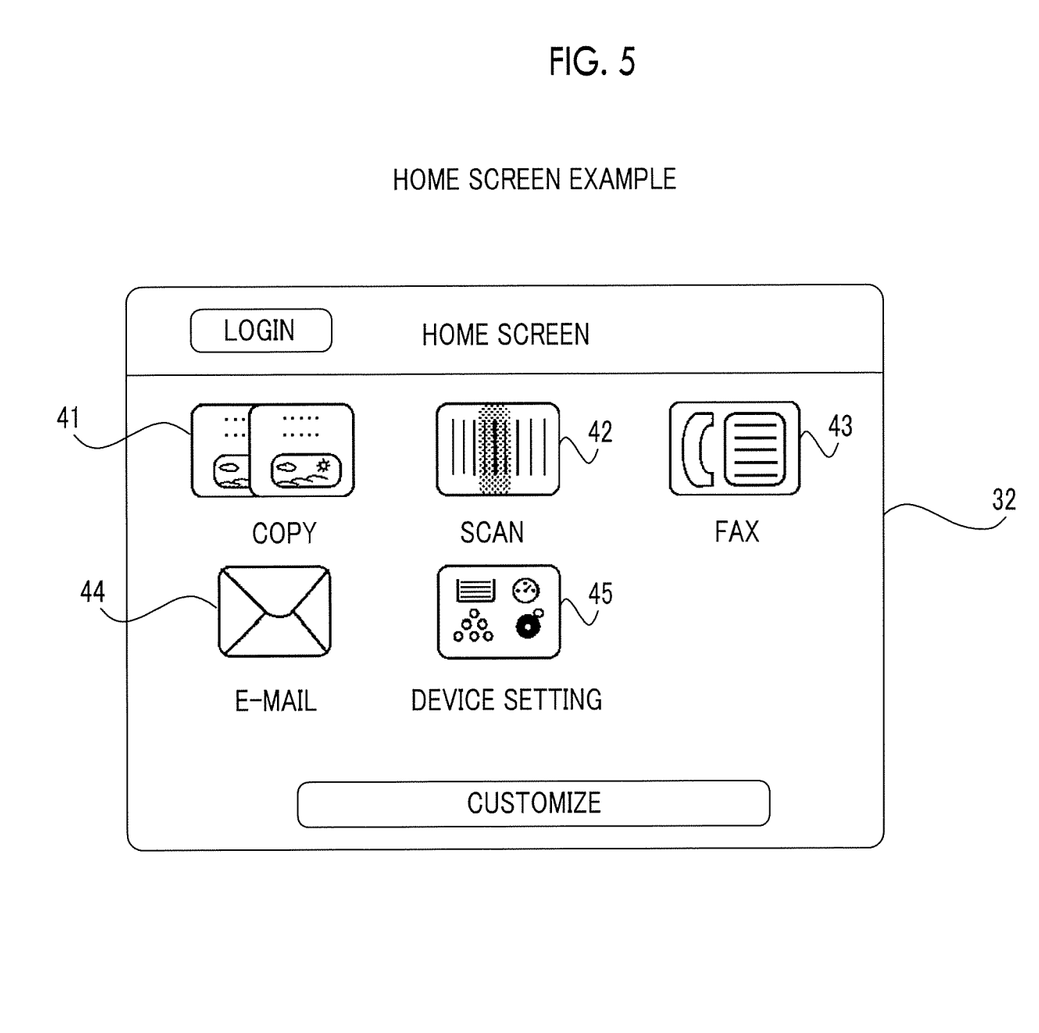
FIG. 5 is a diagram showing an enlarged display content of a home screen shown in FIG. 4.

FIG. 4 shows a case where a home screen shown in a standby state of the image forming apparatus 10 is displayed on the display 32. FIG. 5 shows an enlarged display content of the home screen.

In the home screen example shown in FIG. 5, plural icons 41 to 45 for selecting execution of a certain function are displayed on the operation screen of the display 32.

For example, the icon 41 is an icon for selecting execution of the copy function, and when the user touches and selects the icon 41 with the finger, the copy application program is activated so that the user can use the copy function.

Similarly, the icons 42 to 45 are icons for executing the scan function, the facsimile function, the e-mail transmission and reception function, and the device setting function, respectively.

Here, the icon is an operator expressed by a picture pattern or the like that is displayed on the operation screen, and is used to activate a specific application program (hereinafter abbreviated as an application), or indicates an operation position for transitioning to a specific screen. Further, the picture pattern may include not only figures simply designed, but also various characters such as Alphabet, Hiragana, Katakana, Kanji, and the like.

Here, the icons 41 to 45 as shown in FIG. 5 are basic icons for executing the basic functions of the image forming apparatus 10. When the basic icon is deleted and the application corresponding to the basic icon is deleted, the function corresponding to the basic icon cannot be used unless the deleted application is reinstalled.

In the image forming apparatus 10 according to the exemplary embodiment, it is possible to generate a one-touch application obtained by customizing the functions for each user, in addition to the applications having such basic functions.

A method for generating such a one-touch application will be described with reference to FIGS. 6 to 13.

Figure 6:
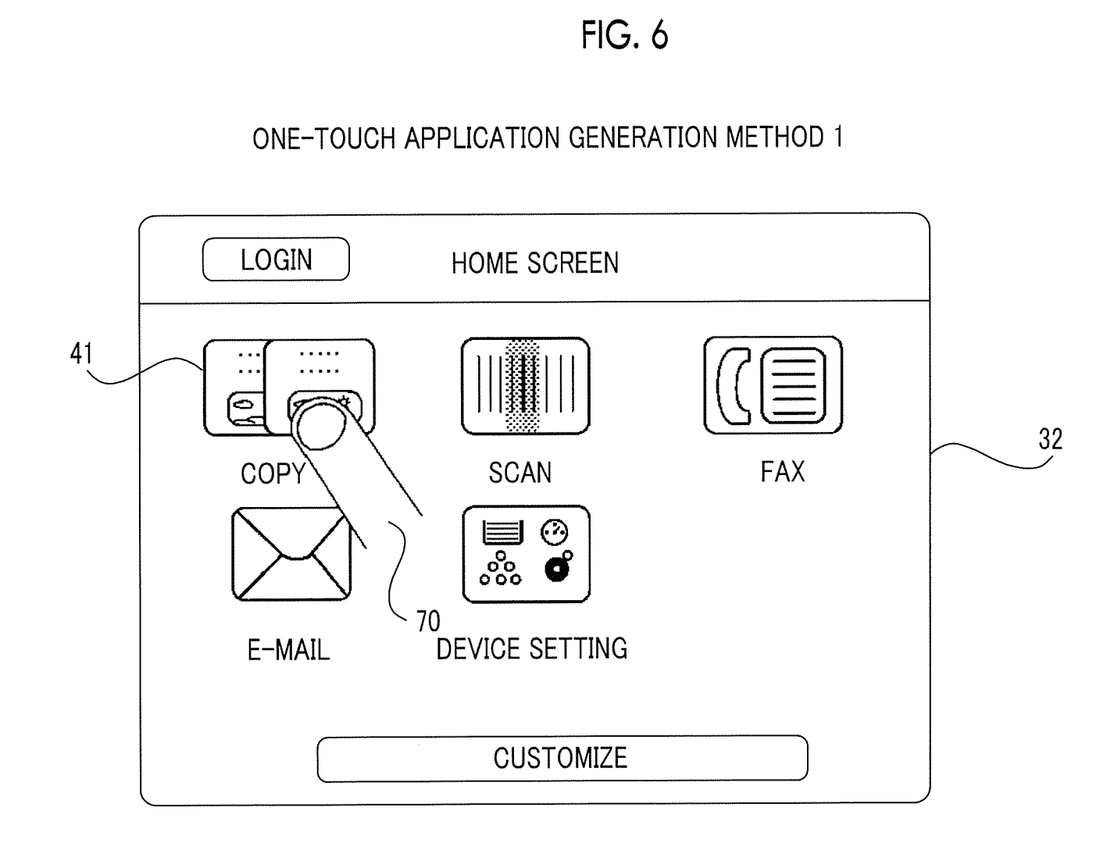
FIG. 6 is a diagram for explaining a generation method of a one-touch application.

First, the user selects an icon of a basic function from which a one-touch application is to be generated. Here, as shown in FIG. 6, a description is given assuming that the user selects the icon 41 corresponding to the copy function with the finger 70.

Figure 7:
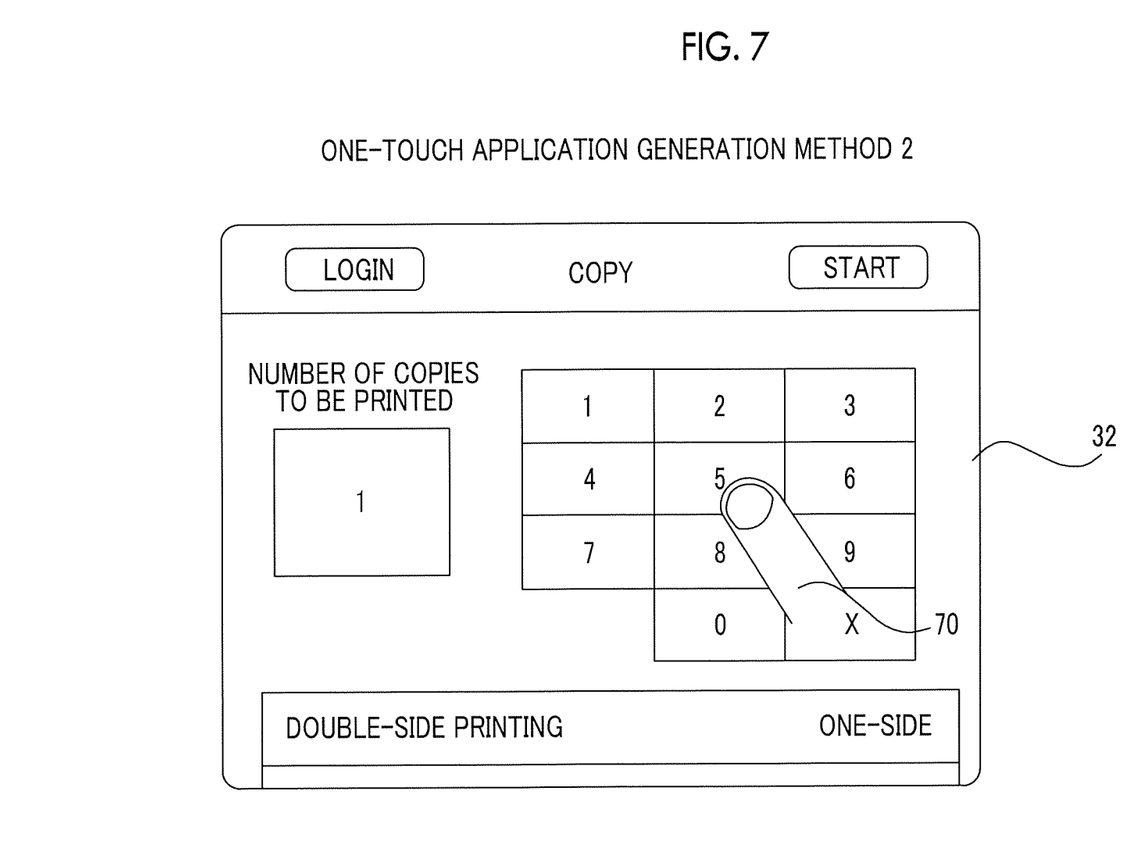
FIG. 7 is a diagram for explaining the generation method of the one-touch application.

When the user selects the icon 41 corresponding to the copy function, a screen for inputting the setting values of various setting items of the copy function as shown in FIG. 7 is displayed. FIG. 7 shows a case where an operation of setting the number of copies to be printed to "5" is performed.

Figure 8:
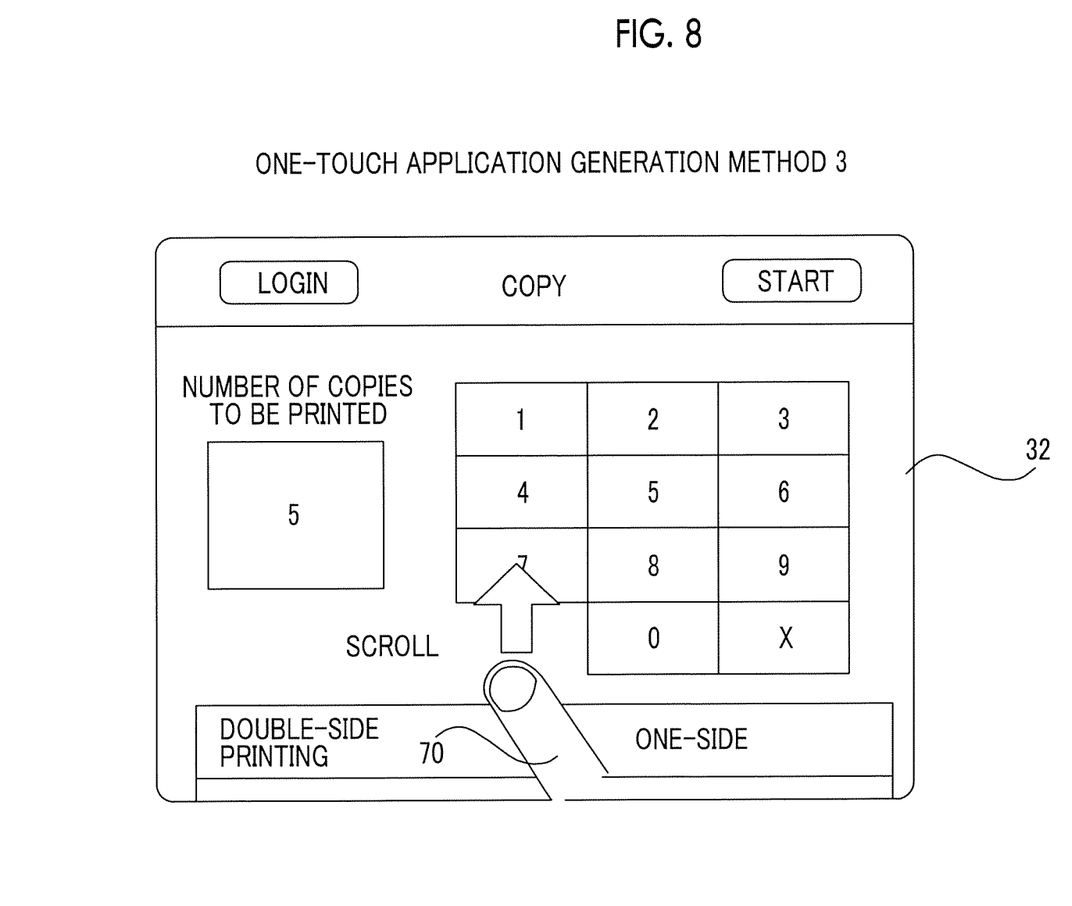
FIG. 8 is a diagram for explaining the generation method of the one-touch application.

Since the operation screen for copying includes a screen for inputting various setting values in addition to the display area of the display 32, as shown in FIG. 8, the user moves the finger 70 in the upward direction on the operation screen to scroll the screen, and the setting item screen on the lower side is displayed.

Figure 9:
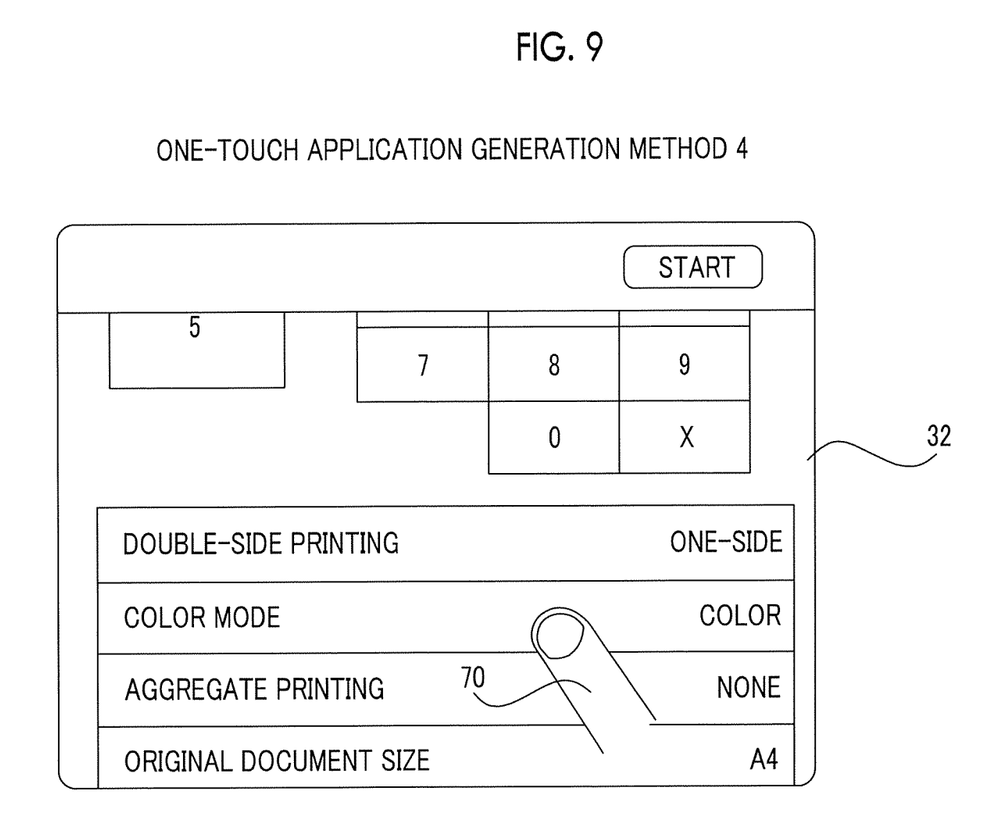
FIG. 9 is a diagram for explaining the generation method of the one-touch application.
Figure 10:
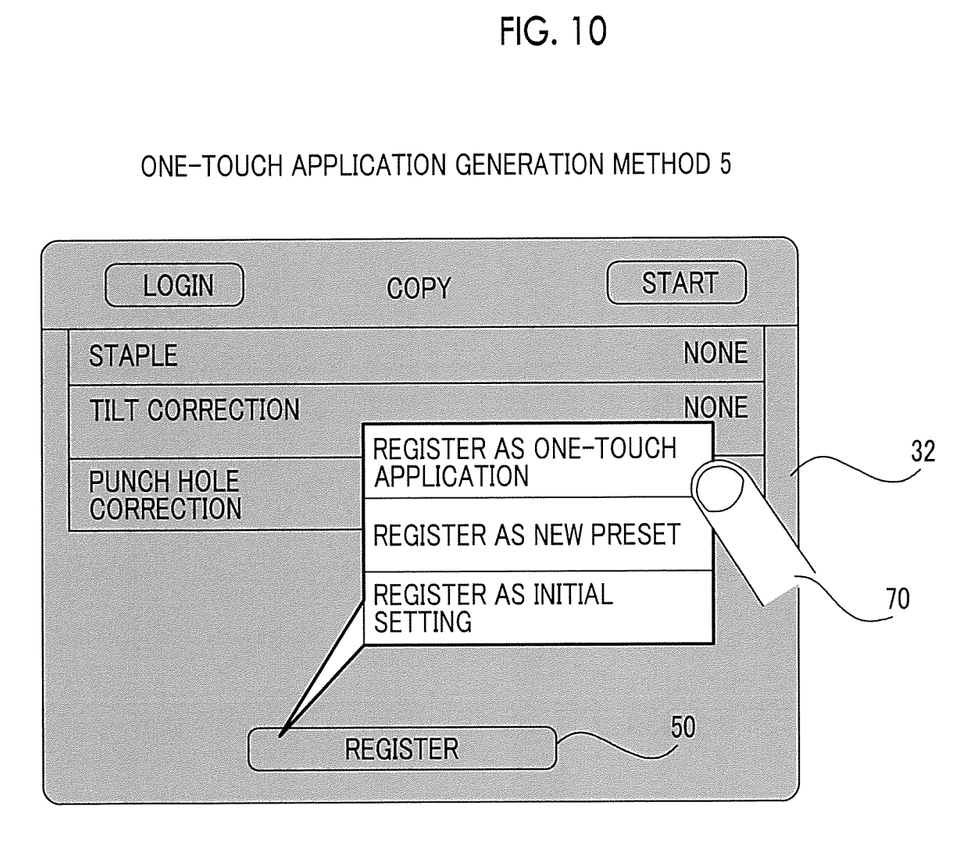
FIG. 10 is a diagram for explaining the generation method of the one-touch application.

Then, as shown in FIG. 9, the user operates other setting items than the number of copies to be printed, and inputs a setting value to be set as a one-touch application.

When the input of various setting values is completed by the method as described above, and as shown in FIG. 10, the user operates a registration button 50 written as "register", a selection screen for registering the input setting value is displayed. Since the user intends to generate the one-touch application here, the user selects the option "register as a one-touch application" from among the displayed options.

Figure 11A:
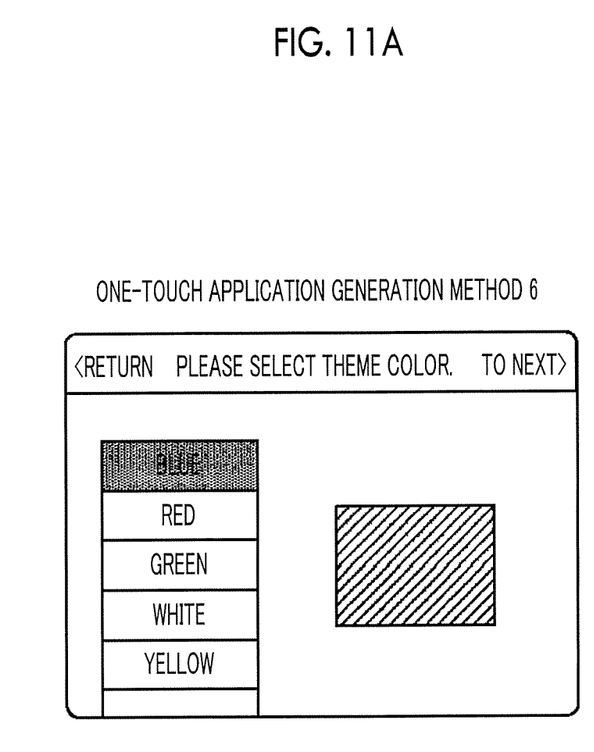
FIGS. 11A and 11B are diagrams for explaining the generation method of the one-touch application.

Then, a theme color selection screen of the one-touch application icon for selecting the execution of the one-touch application as shown in FIG. 11A is displayed on the display 32. Here, since the theme color of the icon 41 of the copy function which is the basic icon is blue color, blue color is selected as the initial selection state.

When the user selects "Next" without changing the initial selection state, the same blue color as the basic icon is selected as the theme color. In addition, the user can select another color other than blue color as the theme color of the one-touch application icon to be generated.

Figure 11B:
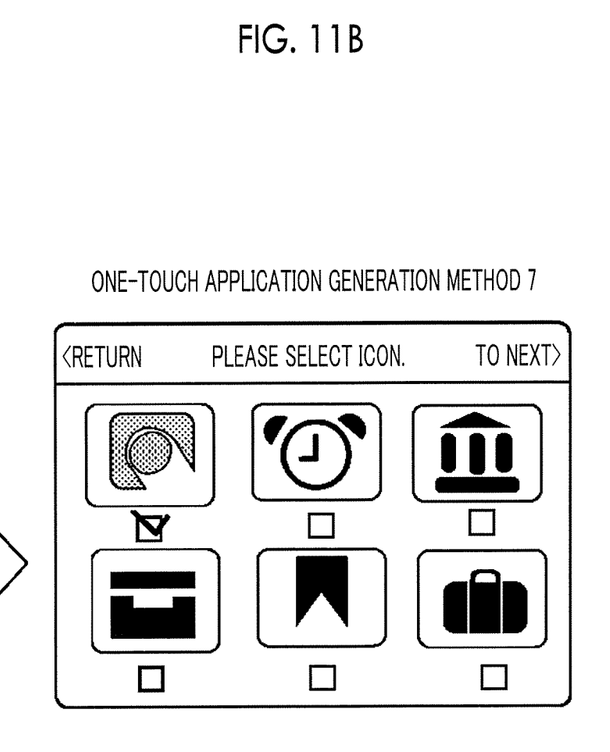

Next to such a theme color selection screen, as shown in FIG. 11B, an icon shape selection screen is displayed on the display 32. On the icon shape selection screen, it is possible to select the shape of the one-touch application icon to be generated, according to the user's desire.

Figure 12A:
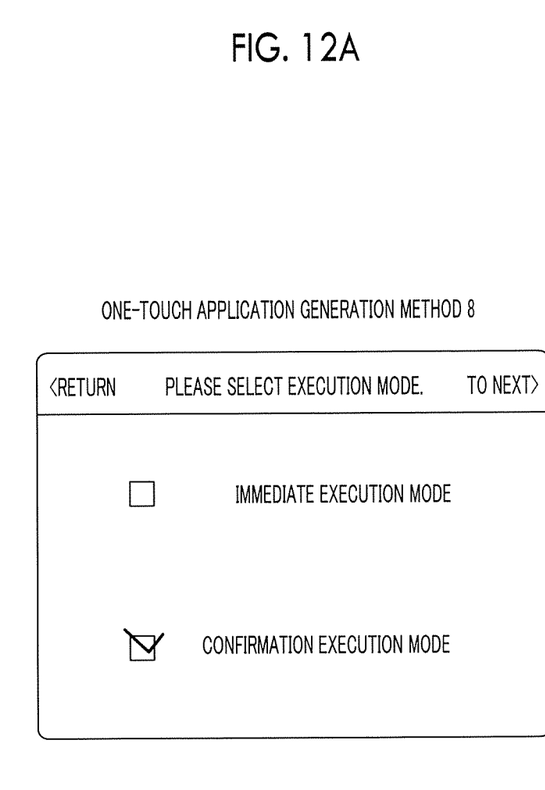
FIGS. 12A and 12B are diagrams for explaining the generation method of the one-touch application.

Then, when the selection of the shape of the one-touch application icon is completed, the execution mode is selected as shown in FIG. 12A. In the execution mode, two execution modes "immediate execution mode" and "confirmation execution mode" can be selected. The "immediate execution mode" is an execution mode in which, when a one-touch application icon is selected, a one-touch application corresponding to the one-touch application icon is activated immediately and executed. In addition, the "confirmation execution mode" is an execution mode in which, when a one-touch application icon is selected, a one-touch application corresponding to the one-touch application icon is not activated immediately, some confirmation screen is once displayed to the user, and the one-touch application is activated only in a case where the user instructs activation of the one-touch application.

The screen shown in FIG. 12A shows a case where "confirmation execution mode" is selected.

Figure 12B:
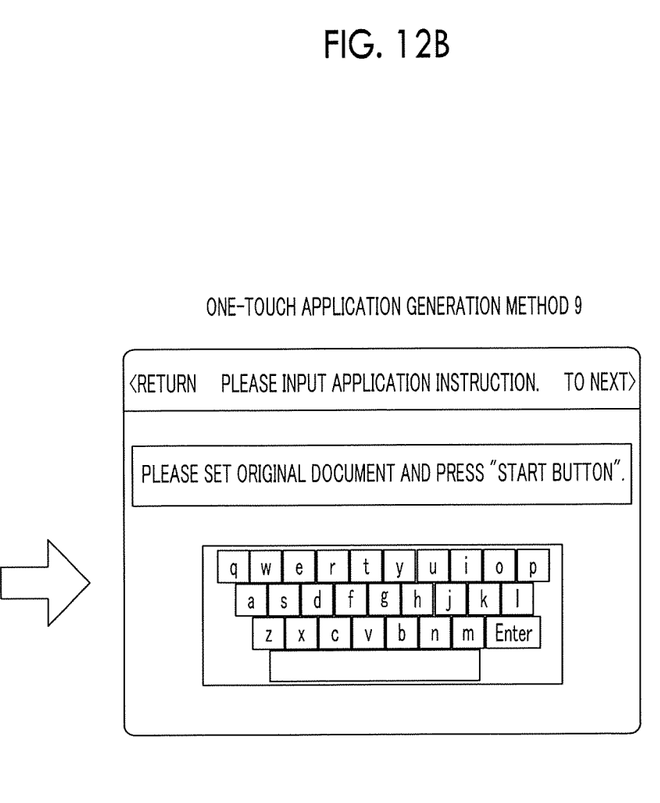

Then, in a case where the "confirmation execution mode" is selected, an input screen of a sentence to be displayed to the user on the confirmation screen as shown in FIG. 12B is displayed on the display 32.

FIG. 12B shows a case where a sentence "Please set an original document and press "start button"" is input.

Here, since the basic application (generation source application: parent application) of the one-touch application being generated this time is an application of the copy function, the word "start button" is input in the initial state. In a case where the basic application of the one-touch application being generated is an application of the e-mail function, the word "send button" is input in the initial state. That is, a preset word is input in the initial state according to the type of the basic application which is the generation source of the one-touch application to be generated.

Figure 13:
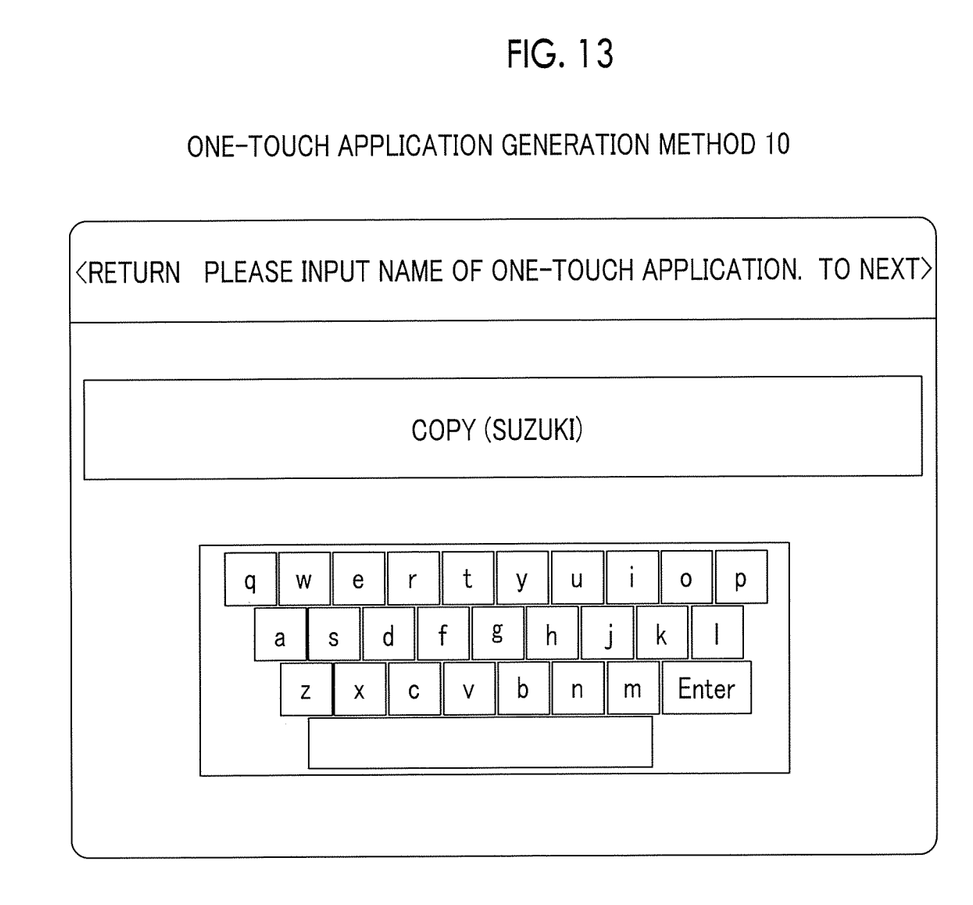
FIG. 13 is a diagram for explaining the generation method of the one-touch application.

When the input of the sentence displayed on the confirmation screen is completed, the name input screen of the one-touch application as shown in FIG. 13 is displayed.

The name input screen shown in FIG. 13 is a screen for inputting the name of the one-touch application to be generated. The screen example shown in FIG. 13 shows a case where the name "copy (Suzuki)" is input as the name of the one-touch application.

Figure 14:
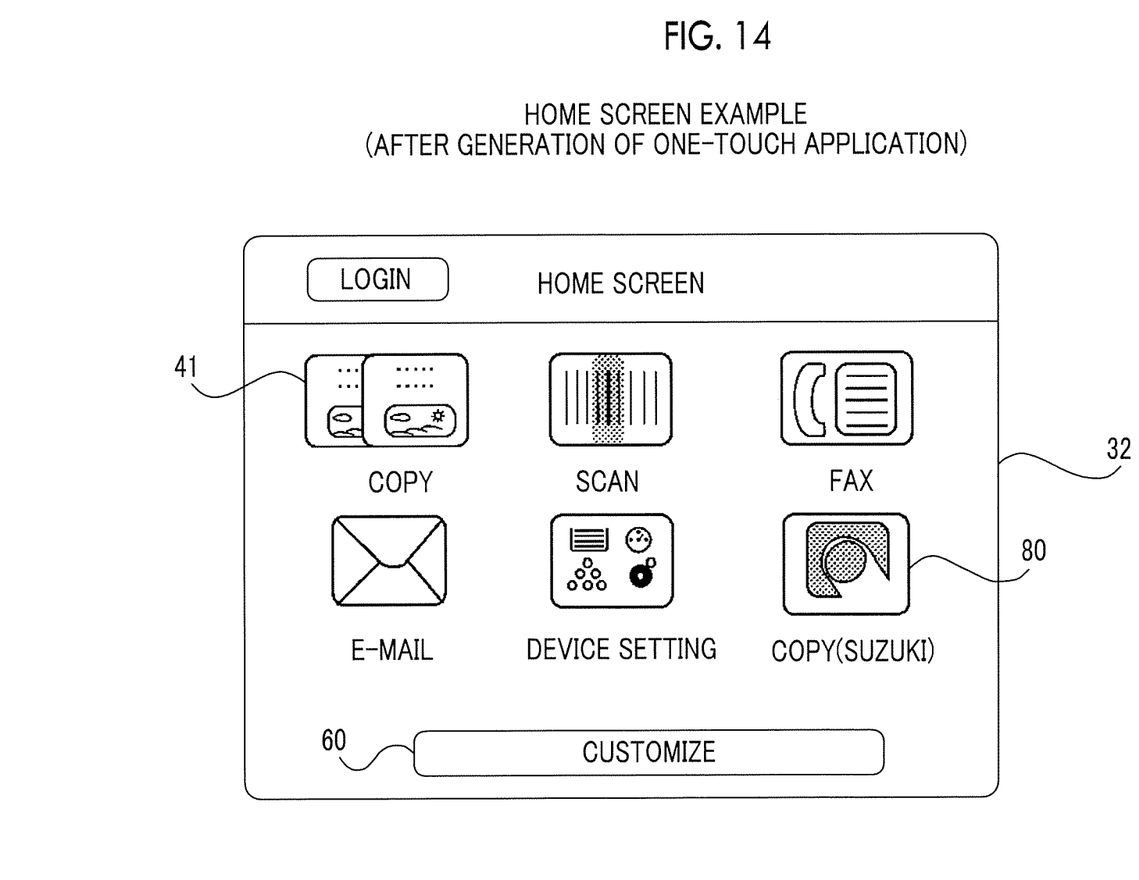
FIG. 14 is a diagram showing an example of a home screen after generation of the one-touch application.

If the one-touch application generation process is executed by the method as described above with reference to FIGS. 6 to 13, a one-touch application icon 80 corresponding to the generated one-touch application is added on the operation screen of the display 32, as shown in FIG. 14.

If the user selects the one-touch application icon 80, it is possible for the user to execute a copy function based on the setting value input in advance by the user.

In the exemplary embodiment, in a case where a basic icon is selected to generate a related icon such as a new one-touch application icon, the controller 31 displays the attribute of the selected basic icon on the display 32 in a state of being initially selected, on a screen for selecting the attribute of the related icon to be generated. Therefore, in a case where the user generates the one-touch application icon, the attribute is left in the initially selected state, so that the one-touch application icon inheriting the attribute information of the selected basic icon is generated.

Figure 15:
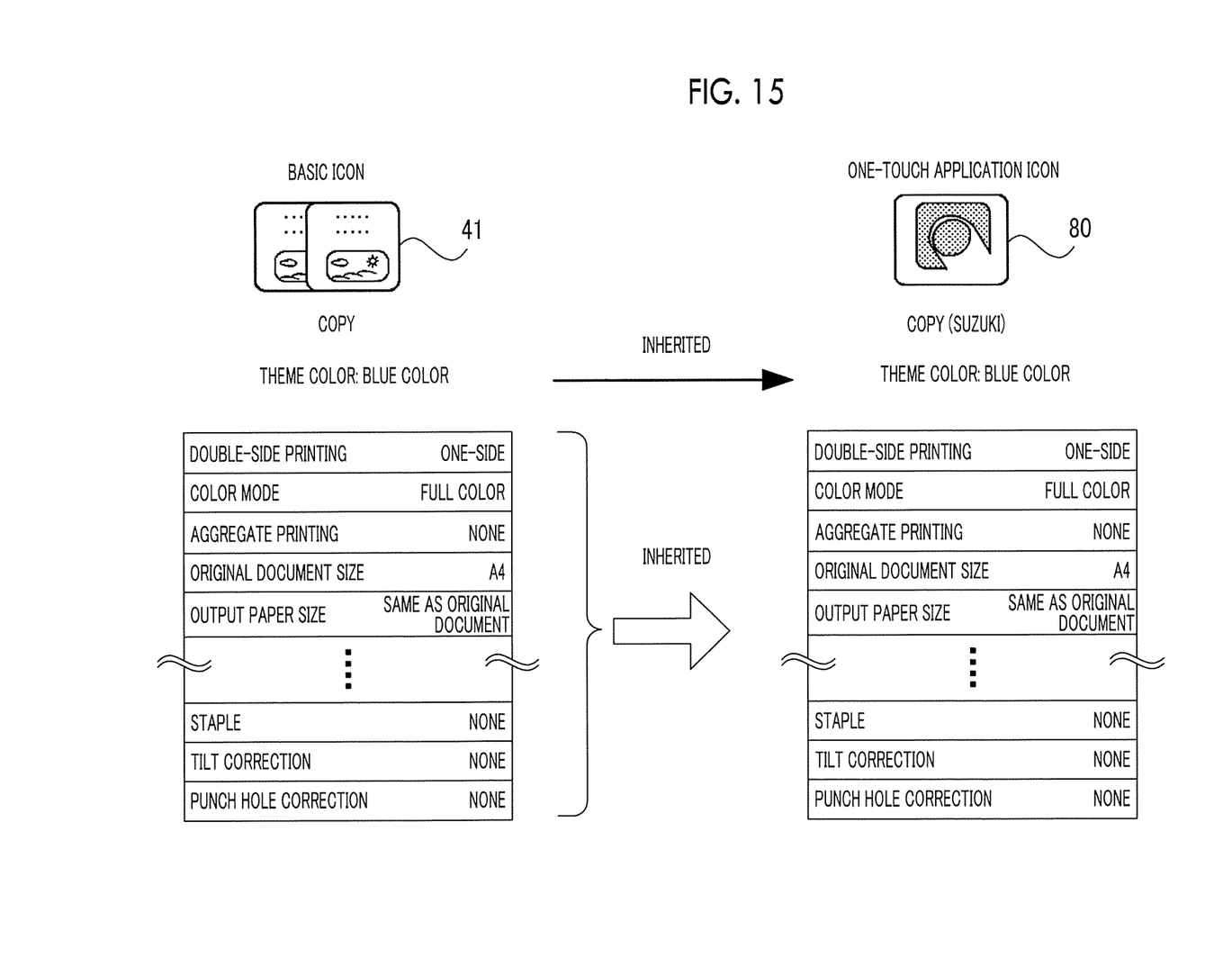
FIG. 15 is a diagram for explaining how attributes are inherited in a case where a one-touch application icon is generated based on a copy icon which is a basic icon.

Specifically, as shown in FIG. 15, in a case where the one-touch application icon 80 is generated based on the copy icon 41 which is the basic icon, the attribute of blue color is inherited as the theme color, and furthermore, the setting details of the various setting items such as double-side printing and color mode, the arrangement order of setting items, and the attribute for display or non-display of the setting items are inherited as they are.

In addition, in a case where the restriction that only the specific user permitted on the basic icon is permitted to perform copy or print in the color mode is set, such restriction information may also be inherited in the one-touch application icon generated based on this basic icon.

By doing so, in a case where the basic icon is selected and copy or print in the color mode is not performed, the user who does not have the output authority in the color mode selects the one-touch application icon generated based on the basic icon and cannot perform copy or print in the color mode.

In addition, since the one-touch application icon generated from the basic icon exists independently of the basic icon, after the one-touch application icon is generated, even if the attributes of the basic icon is changed, the one-touch application icon is not affected.

In addition, in a case where a related icon such as a one-touch application icon is generated based on a certain basic icon, the basic icon and the related icon are icons which are independently present from each other, but may be icons that execute a process using the function of one icon in fact.

Conversely, in a case where a related icon such as a one-touch application icon is generated based on a certain basic icon, an application that is activated when the related icon is selected is generated, apart from the application that is activated when the basic icon is selected, and the basic icon and the related icon may be icons that activate different applications and execute the processes.

Modification

Although the case where the present invention is applied to the image forming apparatus has been described in the above exemplary embodiment, the present invention is not limited to this, and may be applied to various information processing apparatuses displaying icons on the screen, such as a smartphone, a tablet terminal apparatus, a cellular phone apparatus, and a notebook computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display that displays a screen including a basic operator for selecting execution of a certain function and a related operator related to the basic operator; and
a controller that in a case of selecting a basic operator to generate a new related operator, inherits attribute information of the selected basic operator and generates the related operator based on the inherited attribute information, wherein the inherency of the attribute information comprises inheriting a user privilege setting comprising a permission to perform the certain function or the certain function with at least one certain setting value.

2. The information processing apparatus according to claim 1,
wherein the attribute information further comprises at least one of the following information: an outer shape, a display color, an arrangement order of setting items, and information for selecting display or non-display for each setting item.

3. The information processing apparatus according to claim 2,
wherein the related operator is associated with a setting value which is set in advance by a user.

4. The information processing apparatus according to claim 3,
wherein the setting value is set based on a value input on a screen displayed by selecting the basic operator.

5. The information processing apparatus according to claim 4,
wherein in a case of selecting a basic operator to generate a new related operator, the controller displays attribute of the selected basic operator on the display in a state of being initially selected, on a screen for selecting the attribute of the related operator to be generated.

6. The information processing apparatus according to claim 3,
wherein in a case of selecting a basic operator to generate a new related operator, the controller displays attribute of the selected basic operator on the display in a state of being initially selected, on a screen for selecting the attribute of the related operator to be generated.

7. The information processing apparatus according to claim 2,
wherein in a case of selecting a basic operator to generate a new related operator, the controller displays attribute of the selected basic operator on the display in a state of being initially selected, on a screen for selecting the attribute of the related operator to be generated.

8. The information processing apparatus according to claim 1,
wherein the related operator is associated with a setting value which is set in advance by a user.

9. The information processing apparatus according to claim 8,
wherein the setting value is set based on a value input on a screen displayed by selecting the basic operator.

10. The information processing apparatus according to claim 9,
wherein in a case of selecting a basic operator to generate a new related operator, the controller displays attribute of the selected basic operator on the display in a state of being initially selected, on a screen for selecting the attribute of the related operator to be generated.

11. The information processing apparatus according to claim 8,
wherein in a case of selecting a basic operator to generate a new related operator, the controller displays attribute of the selected basic operator on the display in a state of being initially selected, on a screen for selecting the attribute of the related operator to be generated.

12. The information processing apparatus according to claim 1,
wherein in a case of selecting a basic operator to generate a new related operator, the controller displays attribute of the selected basic operator on the display in a state of being initially selected, on a screen for selecting the attribute of the related operator to be generated.

13. The information processing apparatus according to claim 1, wherein the authority information stores setting details in such a manner that a user is permitted to perform the certain function or the certain function with the at least one certain setting value and another user is prohibited from performing the certain function or the certain function with the at least one certain setting value.

14. A non-transitory computer readable medium storing a program causing a computer to execute a process, the process comprising:
displaying a screen including a basic operator for selecting execution of a certain function and a related operator related to the basic operator; and
in a case of selecting a basic operator to generate a new related operator, inheriting attribute information of the selected basic operator and generating the related operator based on the inherited attribute information, wherein the inherency of the attribute information comprises inheriting a user privilege setting comprising a permission to perform the certain function or the certain function with at least one certain setting value.

* * * * *